United States Patent Office 3,536,760
Patented Oct. 27, 1970

3,536,760
CARBAMOYLOXIMES
Linwood K. Payne, Jr., Charleston, W. Va., and Mathias H. J. Weiden, Raleigh, N.C., assignors to Union Carbide Corporation, a corporation of New York
No Drawing. Original application Sept. 23, 1964, Ser. No. 398,744, now Patent No. 3,400,153, dated Sept. 3, 1968. Divided and this application May 31, 1968, Ser. No. 733,249
Int. Cl. C07c 103/32
U.S. Cl. 260—561                               6 Claims

ABSTRACT OF THE DISCLOSURE

Compounds of the formula

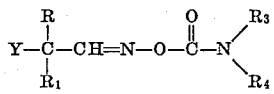

wherein R and $R_1$–R can be hydrogen or lower alkyl, are useful as broad spectrum insecticides and miticides.

---

This application is a division of Ser. No. 398,744, filed Sept. 23, 1964 now U.S. Pat. No. 3,400,153 issued Sept. 3, 1968.

This invention relates to novel carbamoyloximes of α-electronegatively substituted carbonyl compounds. In a particular aspect, this invention is concerned with novel α-electronegatively substituted carbamoylaldoximes and carbamoylketoximes.

In addition to providing a novel class of carbamoyloximes this invention affords pesticidal, e.g., insecticidal, miticidal, and nematocidal compositions having activity comparable or superior to the most effective commercially used materials. The miticidal action of the carbamoyloximes encompassed herein is particularly important in that the mite pests are becoming increasing troublesome and difficult to control inasmuch as they are often resistant to general insecticides and unaffected by specific insecticides used to control a particular crop pest.

Accordingly, an object of this invention is to provide novel carbamoyloximes of α-electronegatively substituted carbonyl compounds. Another object is to provide novel α-electronegatively substituted carbamoylaldoximes and carbamoylketoximes. A further object is to provide novel α-electronegatively substituted, α-methyl, α-substituted N-methylcarbamoyloximes. A still further object is to provide novel carbamoyloximes which possess pesticidal properties such as insecticidal, nematocidal, and miticidal properties. Another object is to provide insecticidal, nematocidal, and miticidal compositions comprising novel carbamoylyoximes as disclosed herein. These and other objects will become apparent to those skilled in the art to which this invention pertains from the ensuing description thereof.

The novel carbamoyloximes of this invention can be represented by Formula I:

(I) 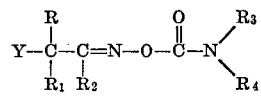

wherein Y represents

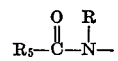

R and $R_1$ are each individually hydrogen or lower alkyl, with at least one of R or $R_1$ being alkyl at all times, most preferably methyl; $R_2$, $R_3$, $R_4$, $R_5$, and $R_6$ are each hydrogen or lower alkyl, most preferably methyl; and with the proviso that R and $R_1$, and $R_1$ and $R_2$ can form a portion of a carbocyclic ring containing from 4 to 7 ring carbon atoms. Preferably, when R to $R_6$ are alkyl, the alkyl group contains from 1 to 4 alkyl carbon atoms.

In the carbamoyloximes represented by Formula I, when R and $R_1$ are both lower alkyl, e.g., methyl, one or more of the hydrogen atoms on one only of the alkyl groups can be substituted by simple substituents such as cyano, nitro, methoxy, methylthio, halogens, trifluoromethyl, amido, formamido or thiocyanato. Also, when R and $R_1$, and $R_1$ and $R_2$ form part of a carbocyclic ring, said ring can be substituted with one or more of the aforementioned simple substituents.

In a preferred aspect of this invention, the carbon atom attached to nitrogen through double bonds, is substituted with either hydrogen or methyl ($R_2$=H or $CH_3$—), and the carbon atom alpha thereto, carries at least one, and preferably two methyl groups (R and/or $R_1$=$CH_3$), while the carbamate nitrogen is substituted with two radicals individually selected from the group consisting of hydrogen and lower alkyl, and preferably hydrogen and methyl ($R_3$ and/or $R_4$=H or $CH_3$), and preferably where the total number of carbon atoms in such radicals together is not more than ten. It has been found that those carbamoyloximes having at least one methyl group on the carbon atom adjacent to the carbon atom attached to the nitrogen atom through double bonds, and not more than two such groups, are particularly good pesticides, as to be disclosed herein.

The novel carbamoyloximes of this invention can be further represented by Formulae II and III:

(II) 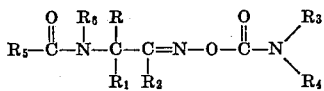

(III) 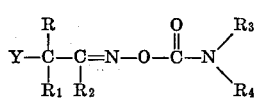

wherein Y, R, $R_1$, $R_3$, and $R_4$ are as hereinabove defined with reference to Formula I and $R_2$ is alkyl. The carbamyloximes specifically represented by Formula II can be referred to as the aldoximes of this invention and those carbamoyloximes specifically represented by Formula III as the ketoximes of this invention. Both these oximes are contemplated as within the preview of this invention.

Particularly preferred carbamoyloximes of this invention can be represented by the aldoximes of Formula IV and the ketoximes of Formula V:

(IV) 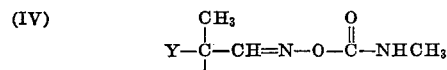

(V) 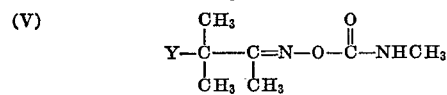

wherein Y is as defined hereinabove with reference to Formula I.

Representative carbamoyloximes encompassed within this invention include, among others, the carbamoyloximes, the N-methylcarbamoyloximes, the N,N-dimethylcarbamoyloximes, the N-ethylcarbamoyloximes, and N-allylcarbamoyloximes of the following aldehydes and ketones: 2-formamido-2-methylpropionaldehyde, 2-acetamido-2-methylpropionaldehyde, 2-(N′-methylformamido)-2-methylpropionaldehyde, 2-formamido-2-methyl-3-butanone, 2-acetamido-2-methyl-3-butanone.

The carbamoyloximes of this invention may be prepared, for example, as follows:

(A) Oxime.—The nitrosochloride dimer is reacted with a slight excess of sodium nitrite (or sodium cyanide) (1.1 mole of sodium nitrite per equivalent of chlorine) by adding the dimer to a suspension of sodium nitrite in dimethylsulfoxide. The addition is conducted with rapid agitation and maintaining a reaction temperature of 20–65° C. for sufficient time to insure reaction (usually 2–3 hours although up to 60 hours may be required). After filtering the reaction mixture to remove sodium chloride, the solvent is removed by stripping under reduced pressure. The residue product is dissolved in an inert water-insoluble solvent such as ether, the ether solution is washed with water to remove any remaining dimethylsulfoxide and then the ether is removed by stripping under reduced pressure. The residue oxime may be purified by recrystallization. The nitrosochloride dimers used to prepare the oxime precursors are prepared by the addition of nitrosyl chloride to a suitable olefin by well-known procedures for example, as taught in J. Gen. Chem., (U.S.S.R.), 22, 2175 (1952).

(B) N-methyl carbamate.—To a solution of the oxime in an inert solvent, if desired, such as diethyl ether or acetone, is added an equimolar quantity of methyl isocyanate. The reaction is conducted, at the boiling point of the reaction mixture and can be carried out in the presence of a catalytic amount of well-known catalysts such as dibutyltin diacetate or di-2-ethylhexanoate, pyridine, triethylamine, or 1,4-diazabicyclo[2.2.2] octane. After sufficient time, usually about 3–6 hours, for the reaction to be completed, the solvent, if employed, is removed by stripping under reduced pressure, and the crude product may be purified by recrystallization. This procedure works well with or without a catalyst and additional solvent is not required as methyl isocyanate itself can serve as solvent.

The synthetic route for preparing the carbamoyloximes of this invention from the corresponding oximes involving the addition of methyl isocyanate can be illustrated as follows:

(1)
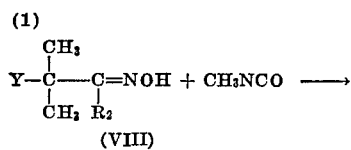

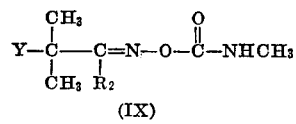

wherein Y and R₂ are as hereinabove defined with reference to Formula I.

Reaction (1) can be carried out by contacting the oxime (VIII) with methyl isocyanate in an inert organic solvent, and preferably in the presence of a tertiary amine or organotin catalyst. The reaction may be effected at temperatures ranging from about 10° C. to about 130° C., and is preferably carried out between room temperature and 80° C. Generally, temperature in excess of about 130° C. are to be avoided in view of the temperature sensitivity of the product carbamoyloxime. The operating pressure may range from about 1 atmosphere to about 10 atmospheres, preferably from about 2 to about 3 atmospheres, and is dependent upon the concentration and vapor pressure of the volatile isocyanate at the reaction temperature. The inert organic solvents that can be employed in the reaction, when additional solvent is desired, are those inert to isocyanates in general, i.e., those free of radicals such as hydroxy or amino radicals. Illustrative solvents are aliphatic and aromatic hydrocarbons, such as hexane, heptane, octane, benzene, toluene, and the like, and ethers such as diethyl ether, diisopropyl ether, and the like. Other solvents which can be employed include ketones such as methyl ethyl ketone and acetone; nitriles such as acetonitrile; and halocarbons such as chloroform and methylene chloride. The ketones and acetonitrile are the solvents of preference. The reaction is preferably carried out in the presence of a tertiary amine or organotin catalyst. The term "organotin catalyst" as used herein is meant to refer to such compounds as dibutyltin diacetate, dibutyltin dichloride, dibutyltin dimethoxide, dibutyltin dilaurate, dibutyltin maleate, dibutyltin di-2-ethylhexenoate, stannous octanoate, stannous oleate, and the like. Generally, amounts of said catalyst from about 0.1 to about 1.0 weight percent of the starting material comprised of methyl isocyanate and the oxime are sufficient. The mol ratio of methyl isocyanate to oxime is preferably an equimolar amount or excess of methyl isocyanate so as to insure that the oxime is completely reacted. The reaction time may vary from about 5 minutes to about 7 days, but normally when operating in the preferred temperature range, reaction times of from about one-half hour to about five hours are sufficient for complete reaction. The carbamoyloxime product formed, either a solid or oily liquid, can be recovered from the reaction mixture by means known to the art, e.g., by vacuum distillation to drive off solvent and excess isocyanate.

The carbamoyloximes of this invention also may be prepared by the reaction of the corresponding oxime with phosgene to form the chloroformate which, in turn, is reacted with amines, for example, ammonia to give the carbamoyloxime or methylamine to give the N-methylcarbamoyloxime or dimethylamine to give the N,N-dimethylcarbamoyloxime. The synthesis is illustrated by the following general reaction scheme:

(2)
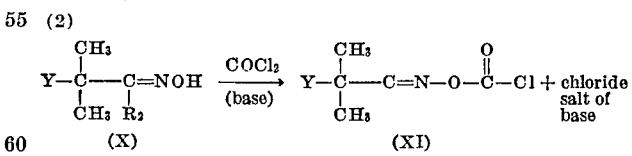

(3)
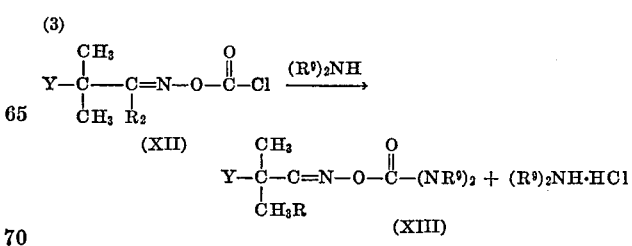

wherein Y and R₂ are as hereinabove defined with reference to Formula I and R⁹ is either hydrogen or lower alkyl.

The oxime precursors (X), may be prepared as noted hereinabove from the nitrosochloride dimer. In step (2), a solution of the phosgene in, e.g., toluene or diethyl ether is conveniently added dropwise to a solution of the oxime compound (X) in toluene or diethyl ether in the presence of an HCl acceptor such as dimethyl aniline. (The dimethyl aniline is usually in the phosgene solution.) The reaction can be carried out at from −30° C. to about 40° C. but will generally be found to proceed most advantageously between 0° C. and room temperature. Below 0° C. the reaction is somewhat sluggish and if the temperature is allowed to rise substantially above 40° C., considerable quantities of nitrile from the dehydration of the aldoxime compound will appear in the reaction mixture. The reaction is slightly exothermic so that some external cooling is usually necessary to maintain the temperature within the desired range. The reaction mixture can be washed with water to remove the amine hydrochloride and the organic layer containing the chloroformate can be used for further reactions. The addition of amine step (3) above, is carried out in the presence of solvents for the amine, such as water, dioxane, toluene, or chloroform, at temperatures between about −40° C. and about 80° C., and preferably below about 40° C. inasmuch as the reaction precedes smoothly even at low temperatures and is so rapid above 40° C. that loss of low boiling amines may occur and some decomposition may take place.

The following examples are illustrative:

EXAMPLE I

N-methylcarbamoyloxime 2-formamido-2-methyl-3-butanone

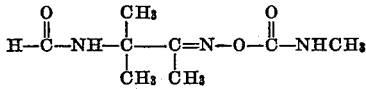

2-formamido - 2 - methyl - 3 - butanone oxime (8 gms.; 0.056 mole) was dissolved in 100 ml. of anhydrous ethyl ether and treated with methyl isocyanate (3.5 gms.; 0.062 mole) and two drops of dibutyltin diacetate. After standing for sixteen hours the reaction mixture was filtered and the crystals washed with ethyl ether. 6 grams (53 percent yield) of 2-formamido - 2 - methyl - 3 - butanone N-methylcarbamoyloxime was obtained, M.P. 118–120° C.

*Analysis.*—Calcd. for $C_8H_{15}N_3O_3$ (percent): C, 47.7; H, 7.5; N, 20.9. Found (percent): C, 47.4; H, 7.3; N, 20.7.

Infrared: N—H at 2.94μ, 3.05μ, 6.55μ and 6.65μ; carbamate C═O at 5.80μ; amide C═O at 5.97μ; carbonate C—O at 8.03 and C═N—O at 10.52μ.

EXAMPLE II 2-formamido-2-methylpropionaldehyde N-methylcarbamoyloxime

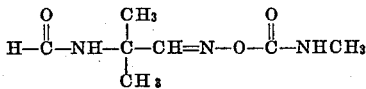

2-formamido - 2 - methyloproprionaldehyde oxime was obtained by allowing 2-amino-2-methylpropionaldehyde oxime (12.6 g.; 0.124 mole) to react for three hours at 35° C. with vinyl formate (10 g.; 0.14 mole) in 200 ml. of anhydrous acetone. The solvent was evaporated under reduced pressure. The residual 2-formamido-2-methylpropionaldehyde oxime was dissolved in 200 ml. of chloroform and treated with methylisocyanate (7.6 g.; 0.134 mole) and 1 drop of dibutyltin diacetate. After two hours at 35° C. the solvent was evaporated under reduced pressure and the residue was stirred with 150 ml. of ethyl acetate. The precipitate was collected by filtration washed with petroleum ether and dried. 2-formamido-2-methylpropionaldehyde N-methylcarbamoyloxime, M.P. 113–115° C., was obtained in 52 percent yield.

*Analysis.*—Calcd. for $C_7H_{13}N_3O_3$ (percent): C, 44.9; H, 7.0; N, 22.7. Found (percent): C, 44.6; H, 7.2; N, 22.4.

EXAMPLE III 2-(N′-methylformamido)-2-methylpropionaldehyde N-methylcarbamoyloxime

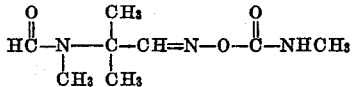

2-(N-methylformamido) - 2 - methylpropionaldehyde oxime (4 gms.; 0.027 mole) was dissolved in 200 ml. of anhydrous acetone and heated at 40° C for eight hours with methyl isocyanate (1.7 gms.; 0.3 mole). The solvent was stripped in vacuo and the residue heated to 50°/3 mm. 2-N′-methylformamido) - 2-methyl-proprioaldehyde N-methylcarbamoyloxime was obtained as a viscous oil weighing 5 gms. (92 percent yield).

*Analysis.*—Calcd. for $C_8H_{15}N_3O_3$ (percent): C, 47.8; H, 7.5; N, 20.9. Found (percent): C, 47.6; H, 8.0; N, 20.4.

Infrared: Carbamate N—H, 3.0μ and 6.6μ; carbamate C═O, 5.82μ; carbamate C—O, 8.05μ; C═N—O, 10.55μ; amide C═O, 6.05μ. Weak C≡N impurity noted at 4.48μ.

EXAMPLE IV 2-acetamido-2-methylpropionaldehyde N-methylcarbamoyloxime

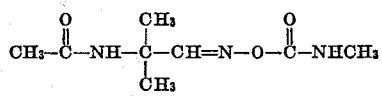

2-acetamido-2-methylpropionaldehyde oxime was treated with methyl isocyanate in chloroform solution to produce 2-acetamido - 2 - methylpropionaldehyde N-methylcarbamoyloxime in 46 per cent yield; M.P. 143–145° (ethyl acetate).

*Analysis.*—Calcd. for $C_8H_{15}N_3O_3$ (percent): C, 47.7; H, 7.5; N, 20.9. Found (percent): C, 48.1; H, 7.8; N, 21.1.

Infrared: Carbamate C═O at 5.78μ; amide C═O at 6.08μ; carbamate C—O at 7.93μ and C═N—O at 10.7μ.

EXAMPLE V 2-acetamido-2-methyl-3-butanone N-methylcarbamoyloxime

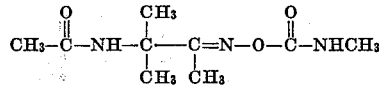

2-acetamido-2-methyl-3-butanone oxime (4 gms.; 0.025 mole) was dissolved in 70 ml. of dimethylformamide and treated with methyl isocyanate (1.7 gms.; 0.03 mole) and two drops of dibutyltin diacetate for sixty hours at room temperature. The solvent was evaporated under reduced pressure and the residue treated with 100 ml. of ether. The resulting solid was collected by filtration, washed with ether and dried. There was obtained 5 gms. (93 percent yield) of 2-acetamido-2-methyl-2-butanone N-methylcarbamoyloxime, M.P. 100–103° C.

*Analysis.*—Calcd. for $C_9H_{17}N_3O_3$ (percent): C, 50.2; H, 8.0. Found (percent): C, 48.6; H, 8.4.

Infrared: N—H at 2.95μ, 3.04μ, 6.4μ, and 6.65μ; carbamate C═O at 5.8μ; amide C═O at 6.08μ; carbamate C—O at 8.08μ and C═N at 10.54μ.

The carbamoyloximes of this invention show particular promise as pesticides. They are particularly useful in agricultural applications to combat undesirable organisms which adversely effect plant life. The carbamoyloximes disclosed herein have been shown to be particularly active as insecticides, nematocides and miticides.

2-formamido - 2 - methylbutan-3-one N - methylcarbamoyloxime has exhibited for example, significant oxic properties to the two-spotted mite. The carbamoyloxime, 2-formamido-2-methyl-propionaldehyde N-methylcarbamoyloxime has been shown to be highly toxic to the two-spotted mite, the bean aphid, the common housefly, and the root-knot nematode. 2-acetamido-2-methyl-propionaldehyde N-methylcarbamoyloxime and 2-(N'-methylformamido)-2-methylpropionaldehyde N-methylcarbamoyloxime show a similar spectrum of activity to pests.

Table I infra, illustrates carbamoyloximes of this invention and their pesticidal activity.

acetone, addition of an emulsifier, and the serial dilution with water. Paired seed leaves, excised from Tendergreen bean plants, were dipped in the test formulations until thoroughly wetted, excess liquid being removed by gentle shaking. While the leaves were drying in a ventilated hood, wilting was prevented by placing the stems in water. When dry, the paired leaves were separated and each one was placed in a 9-centimeter Petri dish lined with moistened filter paper. Four randomly selected larvae were introduced into each dish and the dishes were closed. The

TABLE I.—BIOLOGICAL ACTIVITY OF N-METHYL CARBAMOYLOXIMES [1]

| | | $LD_{50}$, p.p.m. | | | | | $ED_3$ (lbs./acre) |
|---|---|---|---|---|---|---|---|
| Compound Name | | BA | M | AW | MBB | HF | NEMA |
| Example: | | | | | | | |
| 1 | 2-formamido-2-methyl-3-butanone N-methylcarbamoyloxime | >100 | 30 | 1,000 | >100 | 120 | >75 |
| 2 | 2-formamido-2-methylpropionaldehyde N-methylcarbamoyloxime | 6 | 15 | 330 | 150 | 2 | 4.8 |
| 3 | 2-(N'-methylformamido)-2-methylpropionaldehyde N-methylcarbamolyoxime | 12 | 16 | >1,000 | 100 | 10 | 19 |
| 4 | 2-acetamido-2-methylpropionadlehyde N-methylcarbamoyloxime | 12 | 17 | >1,000 | >100 | 4 | 50 |
| 5 | 2-acetamido-2-methyl-3-butanone N-methylcarbamoyloxime | 100 | 400 | >1,000 | >100 | 800 | >75 |

[1] BA=Bean Aphid; M=Two-Spotted Mite; AW=Southern Armyworm; MBB=Mexican Bean Beetle; HF=House Fly; NEMA=Root-Knot Nematode.

NOTE.—$ED_3$=a given concentration of N-methylcarbamoyloxime which will elicit a rating of "3" (light galling,) on a scale of "1 to 5". As used herein the term $ED_3$ is for all practical purposes synonymous with the term $LD_{50}$; but in pounds/acre.

The carbamoyloximes of this invention have been tested for activity against the following representative pests: bean aphid, armyworm, Mexican bean beetle, housefly, two-spotted mite, and root-knot nematode.

The tests employed and shown in the tables herein are as follows:

APHID FOLIAGE SPRAY TEST

Adults and nymphal stages of the bean aphid (*Aphis fabae* Scop.), reared on potted dwarf nasturtium plants at 65–70° F. and 50–70 percent relative humidity, constituted the test insects. For testing purposes, the number of aphids per pot was standardized to 100–150 by trimming plants containing excess aphids. The test compounds were formulated by a standard procedure which involved solution in acetone, addition of an emulsifier, and then serial dilution with water. The potted plants (one pot per concentration tested), infested with 100–150 aphids, were placed on a revolving turntable and sprayed with 100–110 milliliters of test compound formulation by use of a DeVilbiss spray gun set at 40 p.s.i.g. air pressure. This application, which lasted 30 seconds, was sufficient to wet the plants to run-off. As a control, 100–110 milliliters of a water acetone emulsifier solution containing no test compound were also sprayed on infested plants. After spraying, the pots were placed on their sides on a sheet of white standard mimeograph paper which had been previously ruled to facilitate counting. Temperature and humidity in the test room during the 24-hour holding period were 65–70° F. and 50–70 percent, respectively. Aphids which fell onto the paper and were unable to remain standing after being uprighted were considered dead. Aphids remaining on the plants were observed closely for movement and those which were unable to move the length of the body upon stimulation by prodding were considered dead.

After correcting for natural mortality by means of Abbott's formula, the $LD_{50}$ in p.p.m. was estimated by plotting the logarithm of the concentration versus probit of the mortality in the usual manner.

ARMYWORM LEAF DIP TEST

Larvae of the southern armyworm (*Prodenia eridania*, Cram), reared on Tendergreen bean plants at a temperature of 80±5° F. and a relative humidity of 50±5 percent, constituted the test insects. The test larvae were removed from the colony and held without food for four hours prior to the test. The test compounds were formulated by a standard procedure which involved solution in closed dishes were labeled and held at 80–85° F. for three days. Although the larvae could easily consume the whole leaf within twenty-four hours, no more food was added. Larvae which were unable to move the length of the body, even upon stimulation by prodding, were considered dead. After correcting for natural mortality by means of Abbott's formula, the $LD_{50}$ in p.p.m. was estimated by plotting the logarithm of the concentration versus probit of the mortality in the usual manner.

MEXICAN BEAN BEETLE LEAF DIP TEST

Third instar larvae of the Maxican bean beetle (*Epilachna varivestis*, Muls.), reared on Tendergreen bean plants at a temperature of 80±5° F. and 50±5 percent relative humidity, were the test insects. The test compounds were formulated by a standard procedure which involved solution in acetone, addition of an emulsifier, and then serial dilution with water. Paired seed leaves excised from Tendergreen bean plants were dipped in the test formulation until thoroughly wetted, excess liquid being removed by gentle shaking. While the leaves were drying under a hood, wilting was prevented by placing the stems in water. When dry, the paired leaves were separated and each was placed in a 9-centimeter Petri dish lined with moistened filter paper. Four randomly selected larvae were introduced into each dish, and the dishes were closed. The closed dishes were labeled and held at a temperature of 80±5° F. for three days. Although the larvae could easily consume the leaf within 24 to 48 hours, no more food was added. Larvae which were unable to move the length of the body, even upon stimulation, were considered dead. After correcting for natural mortality by means of Abbott's formula, the $LD_{50}$ in p.p.m. was estimated by plotting the logarithm of the concentration versus probit of the mortality in the usual manner.

FLY BAIT TEST

Four to six day old adult house flies (*Musca domestica*, L.), reared according to the specifications of the Chemical Specialties Manufacturing Association (Blue Book, MacNair-Dorland Co., N.Y., 1954: pages 243–244, 261) under controlled conditions of 80±5° F. and 50±5 percent relative humidity, were the test insects. The flies were immobolized by anesthetizing with carbon dioxide and twenty-five immobilized individuals, males and females, were transferred to a cage consisting of a standard food strainer about five inches in diameter which was inverted over blotting paper. The test compounds were formulated by a standard procedure which involved solution in acetone, addition of an emulsifier and then serial dilution with water. Fifteen milliliters of the test formulation were added to a soufflé cup containing a one-inch square of an absorbent pad. This bait cup was introduced and centered on the blotting paper under the food strainer prior to admitting the flies. The caged flies were allowed to feed on the bait for twenty-four hours, at a temperature of $80\pm5°$ F. and the relative humidity of $50\pm5$ percent. Flies which showed no sign of movement on prodding were considered dead. After correcting for natural mortality by means of Abbott's formula, the $LD_{50}$ in p.p.m. was estimated by plotting the logarithm of the concentration versus probit of the mortality in the usual manner.

MITE FOLIAGE SPRAY TEST

Adults and nymphal stages of the two-spotted mite (*Tetranychus telarius* L.), reared on Tendergreen bean plants at $80\pm5°$ F. and $50\pm5$ percent relative humidity, were the test organisms. Infested leaves from a stock culture were placed on the primary leaves of two bean plants six to eight inches in height, growing in a two-and-a-half inch clay pot. 150–200 mites, a sufficient number for testing, transferred from the excised leaves to the fresh plants in a period of twenty-four hours. Following the twenty-four hour transfer period, the excised leaves were removed from the infested plants. The test compounds were formulated by a standard procedure which involved solution in acetone, addition of an emulsifier, and then serial dilution with water. The potted plants (one pot per concentration) were placed on a revolving turntable and sprayed with 100–110 milliliters of test compound formulation by use of a DeVilbiss spray gun set at 40 p.s.i.g. air pressure. This application, which lasted 30 seconds, was sufficient to wet the plants to run-off. As a control, 100–110 milliliters of a water solution containing acetone and emulsifier in the same concentrations as the test compound formulation, but containing no test compound, were also sprayed on infested plants. The sprayed plants were held at $80\pm5°$ F. and $50\pm5$ percent relative humidity for six days, after which a mortality count of motile forms was made. Microscopic examination for motile forms was made on the leaves of the test plants. Any individual which was capable of locomotion upon prodding was considered living. After correcting for natural mortality by means of Abbott's formula, the $LD_{50}$ in p.p.m. was estimated by plotting the logarithm of the concentration versus probit of the mortality in the usual manner.

MITE SYSTEMIC TEST

Adults and nymph stages of the two-spotted mite (*Tetranychus telarius* L.), reared on Tendergreen bean plants at $80\pm5°$ F. and $50\pm5$ percent relative humidity, were the test organisms. Infested leaves from a stock culture were placed on the primary leaves of two bean plants six to eight inches in height, growing in a two-and-a-half inch clay pot. 150–200 mites, a sufficient number for testing, transferred from the excised leaves to the fresh plants in a period of twenty-four hours. The test compounds were formulated by a standard procedure of solution in acetone, addition of an emulsifier, and then serial dilution with water. The potted plants were placed in 4 oz. paper containers, and thirty milliliters of the test formulation were drenched into the pot containing the infested plants. The treated plants were held for forty-eight hours at $80\pm5°$ F. and $50\pm5$ percent relative humidity. After the forty-eight hour holding period, microscopic examination for motile forms was made on the leaves of the test plants. Any individual capable of locomotion upon prodding was considered living. After correcting for natural mortality by means of Abbott's formula, the $LD_{50}$ in p.p.m. was estimated by plotting the logarithm of the concentration versus probit of the mortality in the usual manner.

NEMATOCIDE TEST

Infective migratory larvae of the root-knot nematode (*Meloidogyne incognita*, var. *acrita*), reared in the greenhouse on roots of Coleus plants constituted the test organism. Infected Coleus plants were removed from the culture and the roots were chopped very finely. A small amount of these choppings was added to a pint Mason jar containing approximately 180 cubic centimeters of soil. The jar was capped and incubated for one week at room temperature. During the incubation period eggs of the nematode hatch and the larval forms migrate into the soil. The test compounds were formulated by a standard procedure of solution in acetone, addition of an emulsifier, and the serial dilution with water. Ten milliliters of the test formulation were added to each of two jars for each dose tested. Thus each jar contained 25 milligrams of test compound, an amount roughly equivalent to 75 pounds per acre. Following the introduction of the test formulation, the jars were capped and the contents thoroughly mixed on a ball mill for five minutes. The jars remained capped at room temperature for 48 hours whereupon the contents were transferred to 3-inch pots. These pots were then seeded with cucumber as an indicator crop and placed in the greenhouse where they were cared for in the usual fashion for approximately three weeks. The cucumber plants were removed from the pots and the soil was washed from the roots. The amount of galling was determined by visual inspection and rated according to the following designations:

5=no galling; perfect control
4=very light galling
3=light galling
2=moderate galling
1=severe galling, equal to untreated plants The controls exhibited no pesticidal activity.

The carbamoyloximes contemplated in this invention may be applied as insecticides, acaracides and nematocides according to methods known to those skilled in the art. Pesticidal compositions containing the compounds as the active toxicant will usually comprise a carrier and/or diluent, either liquid or solid.

Suitable liquid diluents and/or carriers include water, petroleum distillates, or other liquid carriers with or without surface active agents. Liquid concentrates may be prepared by dissolving one of these compounds with a nonphytotoxic solvent such as acetone, xylene, or nitrobenzene and dispersing the toxicants in water with the aid of suitable surface active, emulsifying and dispersing agents.

The choice of dispersing and emulsifying agent and the amount employed is dictated by the nature of the composition and the ability of the agent to facilitate the dispersion of the toxicant. Generally, it is desirable to use as little of the agent as is possible, consistent with the desired dispersion of the toxicant in the spray so that rain does not re-emulsify the toxicant after it is applied to the plant and wash it off the plant. Nonionic, anionic, or cationic dispersing and emulsifying agents may be employed, for example, the condensation products of alkylene oxides with phenol and organic acids, alkyl aryl sulfonates, complex ether alcohols, quaternary ammonium compounds, and the like.

In the preparation of wettable powder or dust or granulated compositions, the active ingredient is dispersed in and on an appropriately divided solid carrier such as clay, talc, bentonite, diatomaceous earth, fuller's earth, and the like. In the formation of the wettable powders the aforementioned dispersing agents as well as lignosulfonates can be included.

The required amount of the toxicants contemplated herein may be applied per acre treated in from 1 to 200 gallons or more of liquid carrier and/or diluent in from about 5 to 500 pounds of inert solid carrier and/or diluent. The concentration in the liquid concentrate will usually vary from about 10 to 95 percent by weight and in the solid formulations from about 0.5 to about 90 percent by weight. Satisfactory sprays, dusts, or granules for general use contain from about ¼ to 15 pounds of active toxicant per acre.

The pesticides contemplated herein prevent attack by insects, mites, and nematodes upon plants or other material to which the pesticides are applied and they have high residual toxicity. With respect to plants they have a high margin of safety in that when used in sufficient amount to kill or repel the insects, they do not burn or injure the plant, and they resist weathering which includes wash-off caused by rain, decomposition by ultra-violet light, oxidation, or hydrolysis in the presence of moisture or, at least, such decomposition, oxidation, and hydrolysis as would materially decrease the desirable insecticidal characteristic of the toxicants or impart undesirable characteristics, for instance, phytotoxicity, to the toxicants. The toxicants are so chemically inert that they are compatible with substantially and other constituents of the spray schedule, and they may be used in the soil, upon the seeds, or the roots of plants without injuring either the seeds or roots of plants, yet by inhibition or root uptake they will kill the pests feeding thereon.

It also has been found that carbamoyloximes of this invention can be synergized with a wide-variety of compounds except acidic and phenolic compounds or compounds readily metabolized thereto. Little or no synergism has been observed with compounds highly active as pesticides by themselves. Compounds showing moderate to poor pesticidal activity yet possessing good anticholinesterase properties are most likely to be synergized. The carbamoyloximes herein can be synergized with synergists such as piperonyl butoxide, propyl isome, sesamex, sulfoxide, methylenedioxyphenyl compounds, and 2-(3,5-dichloro-2-biphenylyloxy)triethylamine. In general, those synergists which are known to synergize the carbamate pesticides also can be used to synergize the carbamoyloximes of this invention such as those synergists disclosed in U.S. Pats. Nos. 2,904,463; 2,904,464; and 2,904,465, incorporated herein by reference.

A concentration range of from about 20 parts synergist to about 1 part carbamoyloxime through 1 part synergist to 5 parts carbamoyloxime are expected to give a synergistic effect.

What is claimed is:

1. Carbamoyloxime compounds of the formula:

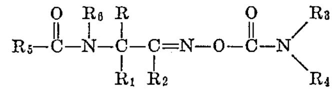

wherein R is lower alkyl and $R_1$, $R_2$, $R_3$, $R_4$, $R_5$, and $R_6$ are hydrogen or lower alkyl.

2. Carbamoyloxime as claimed in claim 1 wherein the compound is 2-formamido-2-methylpropionaldehyde N-methylcarbamoyloxime.

3. Carbamoyloxime as claimed in claim 1 wherein the compound is 2-formamido-2-methyl-3-butanone N-methylcarbamoyloxime.

4. Carbamoyloxime as claimed in claim 1 wherein the compound is 2-(N'-methylformamido)-2-methylpropionaldehyde N-methylcarbamoyloxime.

5. Carbamoyloxime as claimed in claim 1 wherein the compound is 2-acetamido-2-methylpropionaldehyde N-methylcarbamoyloxime.

6. Carbamoyloxime as claimed in claim 1 wherein the compound is 2-acetamido-2-methyl-3-butanone N-methylcarbamoyloxime.

References Cited

UNITED STATES PATENTS 3,400,153 9/1968 Payne et al. --------- 260—566

ALEX MAZEL, Primary Examiner

R. V. RUSH, Assistant Examiner

U.S. Cl. X.R.

424—320